Oct. 22, 1929.  W. H. BEST  1,732,350
RAKE
Filed July 5, 1927
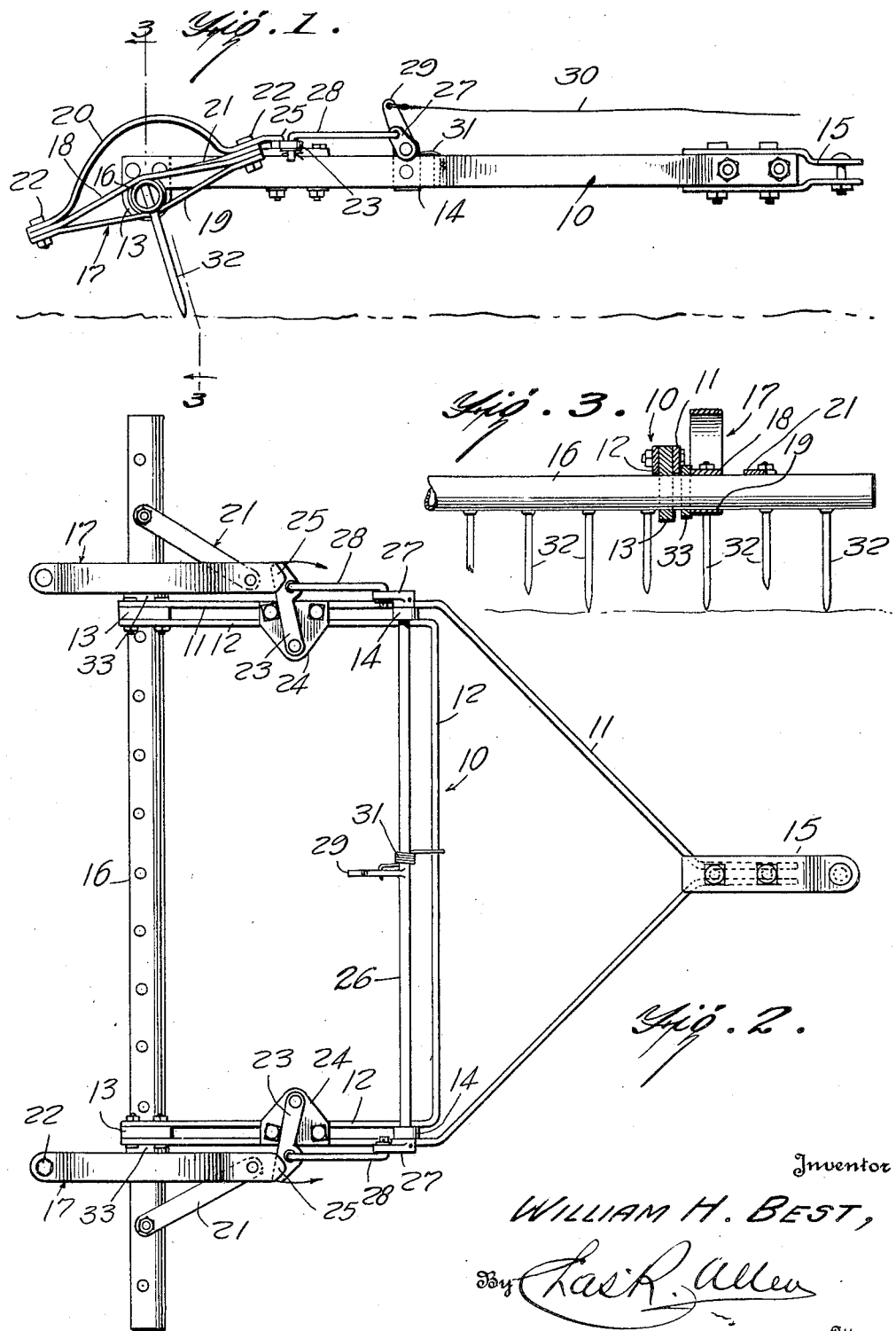
Inventor
WILLIAM H. BEST,
By Chas R. Allen
Attorney Patented Oct. 22, 1929

1,732,350

UNITED STATES PATENT OFFICE

WILLIAM HENRY BEST, OF SACRAMENTO, CALIFORNIA

RAKE

Application filed July 5, 1927. Serial No. 203,329.

It is very desirable just after the pruning is done that the brush, which is scattered over the ground, be raked and burned. This raking is usually done by hand consuming a great deal of time. My invention therefore consists in a rake especially adapted for use in orchards to save time and labor. It is very simple in construction and one that may be readily tripped as for dropping the raked material and which may be quickly reset to its operative position. The scope of my invention extends to whatever constructions may be defined by or included within the terms or language of the appended claims.

In the drawing:

Figure 1 is a side elevation of my improved rake;

Figure 2 is a top plan view thereof, and

Figure 3 is a sectional view taken on line 3—3 of Figure 1.

My invention in the form or embodiment shown in the drawing and briefly described comprises a main frame, 10, which is preferably constructed of two relatively spaced metallic strips, 11 and 12. These frames may be maintained in their spaced relation by means of the bearing blocks, 13, at their rearward ends and the blocks, 14, at the forward ends thereof. The clevis, 15, may be secured to the forward end of the outer frame, 11, in any desired manner.

To obtain the best results I have provided the rake portion of my invention with a tubular member or axle, 16, which extends transversely of the frame, 10, and is located at the rear end thereof. The tubular portion, 16, is pivotally mounted in the lower ends of the spacings or bearing blocks, 13, as clearly shown in the several views of the accompanying drawing.

Securely mounted to the tubular member, 16, and located on the outer side of each of the ends of the main frame, 10, is a pair of substantially bow shaped members indicated generally as at 17. The bow shaped members, 17, each consist of an upper and lower strip, 18 and 19, and a somewhat curved member or strip, 20, extending across the upper ends thereof as shown in Figure 1.

A slight distance beyond the outer edges of each of the bow shaped members, 17, is a forwardly converging brace member, 21. Bolts, 22, secure the several ends comprising the bow shaped members, 17.

In order to maintain the pivotally mounted rake member, 16, in its operative position or as indicated in Figure 1, I locate upon the upper surface of the main frame, 10, a pair of pivotally mounted dogs or latches, 23, which are in turn freely mounted upon and carried by the plates, 24. The plates, 24, as will be readily seen are secured to the spaced ends of the main frame, 10, by the means of bolts. The outer or free ends of the latches, 23, are of course adapted to engage a forwardly extending and pointed portion on each of the curved members, 20, as indicated at 25.

For the purpose of readily tripping the latches, 23, as for dumping the rake member, I provide a transversely mounted rake shaft, 26, which has secured on each of its outer ends short levers, 27. Links, 28, connect the latches, 23, to the relatively short levers, 27, and are held in their position by means of cotter pins or the like.

A lever, 29, is formed upon the shaft, 26, so that a wire or operating cord, 30, may be connected to it for actuation from the tractor wagon or any other suitable means of drag. A coil spring, 31, is suitably connected between the stationary frame, 10, and the movable shaft, 26, for maintaining the latches, 23, in their normally locked position.

The rake teeth, 32, which are carried by the tubular shaft or member, 16, may be either riveted or bolted thereto as desired. I have found it very desirable in practice to provide each alternate tooth, 32, slightly shorter instead of each of them being of equal length as clearly shown in Figure 3. Referring again to Figure 3 of the accompanying drawing, 33 represents a spacing washer which is preferably located between the stationary main frame, 10, and each of the movably mounted bow shaped members, 17, for the purpose of preventing any binding or wedging action.

It will now be readily seen that a rake constructed in this novel manner may easily pass between or under fruit trees without damage to the trees as the curved members, 20, will deflect the low hanging branches thereby preventing any injury to them. From the foregoing, it will be observed that I have provided a U-shaped frame which includes a spaced arm and a connecting portion; that the axle is journaled on the side arms of the frame; that a series of rake teeth are connected to the axle and extend in the same direction from one side only thereof; that a pair of members extend transversely of and are secured to the axle adjacent the side arms of the frame; that each member includes a portion which is bowed outwardly in a direction opposite the teeth; that latches are respectively mounted on the arms of the frame for cooperation with said members to normally retain the axle against rotation in one direction; and that manually operable means for releasing said latches simultaneously is provided.

It is of course obvious that in order to dump the rake it is merely necessary to pull the operating cord, 30, sufficiently to disengage the outer or free ends of the latches, 23, from the adjacent ends, 25, of the bow shaped members, 17. The teeth 32 will be swung forwardly upon continued forward movement of the frame, and the pointed ends 35 of the bow-shaped members 17 will then engage the ground. Upon continued forward movement of the frame, the members 17 will be rotated until the pointed ends 25 thereof are positioned above and in direct contact with the latches 23. During this rotation, the curved members 20 of the bowed members 17 contact with the ground and thereby support the rake teeth during this period. Thus, the rake is returned to its initial position where it is retained until released by the operator by withdrawing the latches 23 from engagement with the pointed ends 25.

I claim:

1. In a rake, the combination with a U-shaped frame including side arms, of an axle journaled on the side arms of said frame, a series of rake teeth connected to said axle and extending in the same direction from one side only thereof, a member extending transversely of and secured to the axle adjacent one side arm of the frame and including a portion bowed outwardly in a direction opposite the teeth, a latch mounted on the frame for cooperation with said member to normally retain said axle against rotation in one direction, and manually operable means for releasing said latch.

2. In a rake, the combination with a U-shaped frame including spaced arms and a connecting portion, of an axle journaled on the side arms of said frame, a series of rake teeth connected to said axle and extending in the same direction from one side only thereof, a pair of members extending transversely of and secured to the axle adjacent the side arms of the frame, each member including a portion bowed outwardly in a direction opposite the teeth, latches respectively mounted on the arms of the frame for cooperation with said members to normally retain the axle against rotation in one direction, and manually operable means for releasing said latches simultaneously comprising a rock shaft journaled on the frame and operating arms fixed to said shaft, a rock arm at each end of the shaft, links connecting the respective latches and rock arms, and a spring connecting the rock shaft and the connecting portion of the frame for yieldably retaining said latches in engagement with said members.

WILLIAM HENRY BEST.